(12) United States Patent
Yu et al.

(10) Patent No.: US 7,916,797 B2
(45) Date of Patent: Mar. 29, 2011

(54) RESIDUAL FREQUENCY, PHASE, TIMING OFFSET AND SIGNAL AMPLITUDE VARIATION TRACKING APPARATUS AND METHODS FOR OFDM SYSTEMS

(75) Inventors: Heejung Yu, Daejeon (KR); Taehyun Jeon, Sungnam (KR); Myung-Soon Kim, Daejeon (KR); Eun-Young Choi, Daejeon (KR); Sok-Kyu Lee, Daejeon (KR); Deuk-Su Lyu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1105 days.

(21) Appl. No.: 11/286,996

(22) Filed: Nov. 22, 2005

(65) Prior Publication Data
US 2006/0133527 A1 Jun. 22, 2006

(30) Foreign Application Priority Data

Dec. 11, 2004 (KR) .................. 10-2004-0104641
Apr. 29, 2005 (KR) .................. 10-2005-0036018

(51) Int. Cl.
*H04K 1/10* (2006.01)
*H04L 27/00* (2006.01)
*H04J 11/00* (2006.01)

(52) U.S. Cl. .................. 375/260; 375/326; 370/203
(58) Field of Classification Search .................. 375/260, 375/326; 370/203
See application file for complete search history.

(56) References Cited

U.S. PATENT DOCUMENTS
6,112,246 A    8/2000  Horbal et al.
(Continued)

FOREIGN PATENT DOCUMENTS
KR    2004-0050814 A    6/2004

OTHER PUBLICATIONS

Sampling rate conversion and symbol timing for OFDM software receiver Minjian Zhao; Peiliang Qiu; Jinhua Tang; Communications, Circuits and Systems and West Sino Expositions, IEEE 2002 International Conference on vol. 1, Jun. 29-Jul. 1, 2002 pp. 114-118 vol. 1.*
Zhao, "Sampling Rate Conversion and Symbol Timing for OFDM Software Receiver" Jul. 2002, pp. 114-118.*
M. Luise, et al, Carrier Frequency Acquisition and Tracking for OFDM Systems, IEEE Transactions on Communications, vol. 44, No. 11, pp. 1590-1598, Nov. 1996.
B. Yang, et al, Timing Recovery for OFDM Transmission, IEEE Journal on Selective Areas in Communications, vol. 8, No. 11, pp. 2278-2291, Nov. 2000.

*Primary Examiner* — Mohammad H Ghayour
*Assistant Examiner* — Sarah Hassan
(74) *Attorney, Agent, or Firm* — Blakely, Sokoloff, Taylor & Zafman LLP (57) ABSTRACT

An error tracking apparatus and method for tracking a residual frequency error, a phase error, a timing error, and a signal amplitude variation to enhance a phase error tracking performance and a tracking speed in an orthogonal frequency division multiplexing (OFDM) system is provided. The error tracking apparatus and method include: a frequency error corrector for correcting a frequency at a time domain by adding a tracking carrier error estimating value to an initial carrier frequency error estimating value; a signal amplitude tracking corrector for controlling a signal amplitude by multiplying an input signal converted by a fast Fourier transform (FFT) by an output value corresponding to a calculated power of a receive pilot signal; a channel corrector for outputting a channel correcting signal by multiplying the receive pilot signal by a complex conjugate of a frequency channel response of the receive pilot signal; a carrier frequency error estimator for estimating a carrier frequency error parameter using the channel-corrected pilot and providing the tracking carrier frequency error estimating value; a time offset estimator for estimating a time offset parameter using the channel-corrected pilot; and a carrier phase error estimator for estimating a carrier phase error parameter using the channel-corrected pilot.

9 Claims, 10 Drawing Sheets

U.S. PATENT DOCUMENTS

| | | |
|---|---|---|
| 6,249,554 B1 * | 6/2001 | Mobin et al. .................. 375/345 |
| 7,292,527 B2 * | 11/2007 | Zhou et al. .................... 370/203 |
| 2002/0186796 A1 * | 12/2002 | McFarland et al. ............ 375/341 |
| 2003/0058951 A1 * | 3/2003 | Thomson et al. .............. 375/260 |
| 2003/0179776 A1 * | 9/2003 | Sumasu et al. ................ 370/491 |
| 2005/0058193 A1 * | 3/2005 | Saed .............................. 375/232 |
| 2005/0107969 A1 * | 5/2005 | Jitsukawa et al. ............... 702/77 |
| 2006/0140308 A1 * | 6/2006 | MacFarlane Shearer et al. ............................. 375/326 |

\* cited by examiner

RESIDUAL FREQUENCY, PHASE, TIMING OFFSET AND SIGNAL AMPLITUDE VARIATION TRACKING APPARATUS AND METHODS FOR OFDM SYSTEMS

CROSS-REFERENCE TO RELATED APPLICATION

This application claims priority to and the benefit of Korean Patent Applications No. 10-2004-0104641 & 10-2005-0036018 filed in the Korean Intellectual Property Office on Dec. 11, 2004 & Apr. 29, 2005, respectively, the entire contents of which are incorporated herein by reference.

BACKGROUND OF THE INVENTION (a) Field of the Invention

The present invention relates to a residual frequency error, phase error, timing error, and signal amplitude variation tracking apparatus and method. More particularly, the present invention relates to a residual frequency error, phase error, timing error, and signal amplitude variation tracking apparatus and method for enhancing a phase and time offset tracking performance and a tracking speed in orthogonal frequency division multiplexing (OFDM) systems.

(b) Description of the Related Art

In a representative IEEE 802.11a standard of a conventional OFDM packet communication, an initial preamble is used to synchronize frequency and time. However, it is necessary to provide various synchronization tracking algorithms so as to overcome a lowering of system performance which is caused by a residual frequency error, a sampling frequency error, a frequency shift, or the like, due to an estimating error of an initial frequency error and a signal amplitude variation in one frame.

First, in such an OFDM scheme, the effect of carrier frequency error will be explained as follows.

In the case of there being carrier frequency error, the carrier frequency error causes a predetermined phase shift for all subcarriers and an inter carrier interference (ICI) therebetween. When a transmit signal $X_k$ passes through a channel having a channel frequency response $H_k$ and has a frequency error $\epsilon$, a receive signal ($Y_k$) of the k-th subcarrier is given as Equation 1.

$$Y_k = X_k H_k \frac{\sin \pi \varepsilon}{N \sin(\pi \varepsilon/N)} e^{j\pi \varepsilon (N-1)/N} + I_k + W_k \quad \text{(Equation 1)}$$

In Equation 1, N indicates a point number of a fast Fourier transform (FFT), that is, the total number of subcarriers. The $I_k$ is an ICI and is given as Equation 2.

$$I_k = \sum_{l=0, l \neq k}^{N-1} X_l H_l \frac{\sin \pi \varepsilon}{N \sin(\pi(l-k+\varepsilon)/N)} e^{j\pi \varepsilon (N-1)/N} e^{j\pi (l-k)/N} \quad \text{(Equation 2)}$$

In the case of there being a time offset, the time offset causes a phase error to be increased in proportion to an index of the OFDM subcarrier and the time offset is in proportion to a slope of the phase error to the index of the subcarrier.

Accordingly, when one FFT section has an error of I=0 and I≠k, the relation of frequency domain signals ($Y_{k,\tau}$) having an error and a frequency domain signal ($Y_k$) having no error is given as Equation 3.

$$Y_{k,\tau} = Y_k e^{j2\pi \tau k/N} \quad \text{(Equation 3)}$$

In Equation 3, it is given as $$k = -\frac{N}{2}, \ldots, 0, \ldots, \frac{N}{2} - 1.$$

Accordingly, although the time offset is the same, the time offset less affects low-frequency elements which are in the vicinity of DC and more affects high-frequency elements.

When such errors are not tracked and compensated, such errors less affect the beginning part of the frame. However, since such errors are accumulated as the frame is processed toward the ending part, lowering of performance is severe at the ending part of the frame.

Therefore, a pilot symbol having a fixed pattern is used to estimate such errors.

The pilot symbol has been used to estimate a phase in a conventional feedback scheme where the mean value and the slope of the estimated phase are passed through a loop filter and then the pilot symbol is corrected. The feedback scheme can obtain a desired system performance assuming the residual carrier error is very small and the time offset variation is very small.

U.S. Pat. No. 6,122,246 (registered on Jul. 25, 1999), entitled "Apparatus and Method for Clock Synchronization in a Multi-Point OFDM/DMT Digital Communications Systems" is incorporated herein by reference.

This patent discloses that in a communication system using an OFDM scheme, a receive port estimates a frequency error based on a pilot signal, detects a subsymbol including the pilot signal, obtains a phase difference between the detected pilot signal and an adjacent pilot signal and obtains a sampling frequency error based on the above information, in order that a transmit port estimates and tracks a difference between a clock frequency of the receive port and a frequency of the receive port using signal information on a subchannel in which a pilot exists and an adjacent channel.

"Carrier Frequency Acquisition and Tracking for OFDM Systems," IEEE Transactions on Communications, vol. 44, no. 11, pp. 1590-1598, November 1996 (M. Luise etc.) discloses a method for tracking a frequency error by detecting a phase difference between a demodulation symbol of subcarriers and a received symbol.

Also, "Timing recovery for OFDM transmission," IEEE Journal on Selected Areas in Communications, vol. 18, no. 11, pp. 2278-2291, November 2000 (Baoguo Yang) discloses a method for tracking a symbol timing variation due to a clock frequency error using a delay-locked loop (DLL) to synchronize a frequency of a sampling clock.

As described above, the OFDM packet communication system, such as a wireless LAN, acquires a synchronization using a channel estimating value and a frequency error estimating value obtained from a preamble which is placed at the beginning part of one frame. However, when the frame is long, errors are accumulated causing the system performance to be severely lowered. In addition, the time offset, which is regularly increased or decreased according to the time and is caused by the fixed frequency error and the sampling frequency error, must be estimated and then corrected using a pilot symbol of a frequency domain. In Equation 1 and Equation 2, a small amount of the frequency error appears as a predetermined phase error and the time offset appears as a phase error having a slope.

The prior art can be applied when the error is small enough to be corrected by the feedback scheme without lowering the system performance. However, in a real environment, a frequency shift and a phase shift may abruptly occur due to a radio frequency (RF) circuit and an analogue circuit as well as such error, and also, a signal amplitude variation may occur due to a phenomenon where the signal amplitude is gradually increased when a transceiver amplifier turns on. Accordingly, the prior art still has a problem of lowered performance of the OFDM system.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a residual frequency error, phase error, timing error, and signal amplitude variation tracking apparatus and method having advantages of enhancing a phase and time offset tracking performance and a tracking speed in orthogonal frequency division multiplexing (OFDM) systems.

An exemplary residual frequency error, phase error, timing error, and signal amplitude variation tracking apparatus according to an embodiment of the present invention includes: a frequency error corrector for correcting a frequency at a time domain by adding a tracking carrier error estimating value to an initial carrier frequency error estimating value; a signal amplitude tracking corrector for controlling a signal amplitude by multiplying an input signal converted by a fast Fourier transform (FFT) by an output value corresponding to a calculated power of a receive pilot; a channel corrector for outputting a channel correcting signal by multiplying the receive pilot signal by a complex conjugate of a frequency channel response of the receive pilot signal; a carrier frequency error estimator for estimating a carrier frequency error parameter using the channel-corrected pilot and providing the tracking carrier frequency error estimating value; a time offset estimator for estimating a time offset parameter using the channel-corrected pilot; and a carrier phase error estimator for estimating a carrier phase error parameter using the channel-corrected pilot.

An exemplary residual frequency error, phase error, timing error, and signal amplitude variation tracking method in an orthogonal frequency division multiplexing (OFDM) system according to another embodiment of the present invention includes:

a) estimating a carrier frequency error using a sum of phases of a pilot symbol;

b) estimating a time offset by estimating a slope of a phase of a receive pilot symbol;

c) correcting a frequency error in a time domain before a fast Fourier transform by estimating the frequency error using the receive pilot symbol on there being a large residual frequency error or an abruptly shifted frequency phase;

d) at c), on there being a large residual frequency error, correcting the frequency error by adding an initial carrier frequency error to a tracking carrier error estimating value; and e) estimating a signal amplitude error using the pilot symbol according to a signal amplitude.

DETAILED DESCRIPTION OF THE EMBODIMENT

An embodiment of the present invention will hereinafter be described in detail with reference to the accompanying drawings.

Hereinafter, a residual frequency error, phase error, time offset, and signal amplitude variation tracking apparatus and method for an OFDM system according to an exemplary embodiment of the present invention are described with reference to the accompanying drawings.

According to the exemplary embodiment of the present invention, an apparatus and method for entirely tracking a synchronization and amplitude by correcting frequency and phase shift errors and a signal amplitude variation in a packet, as well as correcting a residual carrier frequency error as the prior art, is disclosed.

The apparatus and method is similar to that used in a conventional IEEE 802.11a single-antenna OFDM scheme. However, the apparatus and method are spread to a multiple-antenna system so that a frequency error, a phase error, and a time offset are tracked for the respective antennas, the respective parameters are estimated using pilot subcarriers allocated for the respective OFDM symbols and the frequency error, phase error, and time offset are passed through a loop filter and are corrected in the next OFDM symbol. In this case, the apparatus and method have enhanced tracking performance and speed in comparison with the conventional scheme by employing a feedforward scheme as well as a feedback scheme, since the system performance with the conventional scheme may be lowered due to a time offset of estimating and correcting parameters.

For this purpose, a discrete Fourier transform may be used to extract only a pilot subcarrier, the pilot subcarrier may be used to estimate a tracking parameter, and the tracking parameter may directly be used with a data subcarrier of the corresponding OFDM symbol. In addition, the apparatus and method have enhanced system performance by having functions for estimating a frequency shift, correcting the frequency shift, and tracking a signal amplitude variation of a received signal, which is caused by a characteristic of a power amplifier, so as to cope with the frequency shift due to an RF analogue circuit.

Figure 1:
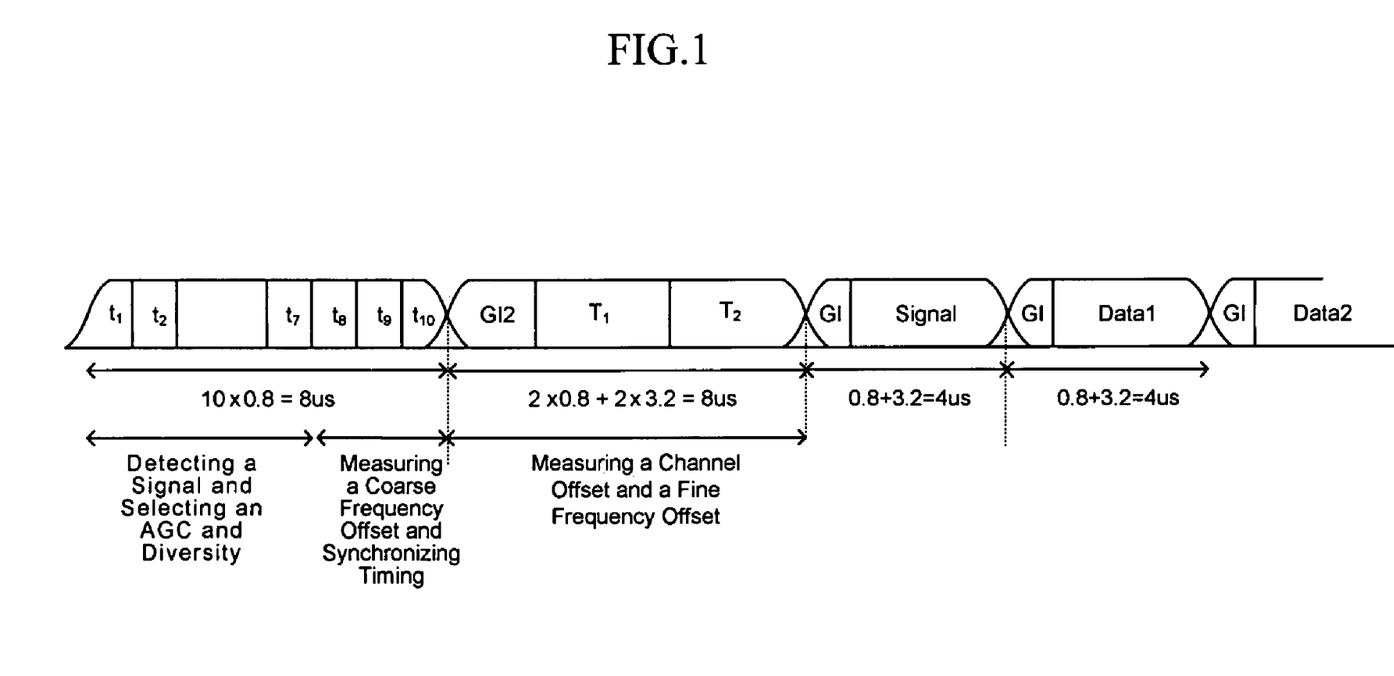
FIG. 1 is a block diagram showing a frame structure of IEEE 802.11a according to an exemplary embodiment of the present invention.
Figure 2:
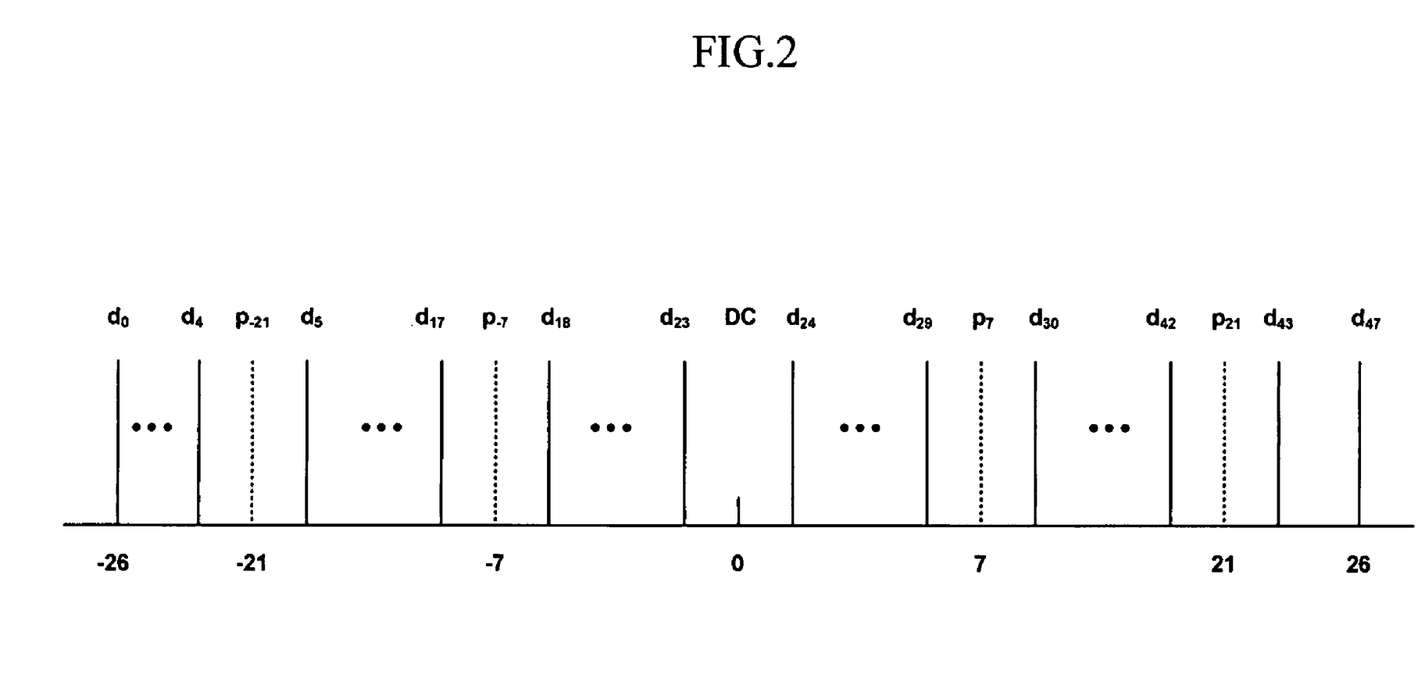
FIG. 2 is a block diagram showing an OFDM subcarrier of IEEE 802.11a according to the exemplary embodiment of the present invention.

FIG. 1 is a block diagram showing a frame structure of IEEE 802.11a according to an exemplary embodiment of the present invention, and FIG. 2 is a block diagram showing an OFDM subcarrier of IEEE 802.11a according to the exemplary embodiment of the present invention. As an example of IEEE 802.11a, it is assumed that a frame according to the exemplary embodiment of the present invention has the same configuration as FIG. 1 and subcarriers of an OFDM symbol are arranged as in FIG. 2.

Referring to FIG. 1, the frame of IEEE 802.11a includes a section for detecting a signal and selecting an AGC and diversity, a section for measuring a coarse frequency offset and synchronizing timing, and a section for measuring a channel offset and a fine frequency offset. Also, the frame may include guard intervals.

The frame has a short preamble and a long preamble which estimate an initial frequency error so that the frame is entirely corrected by using the estimated initial frequency error. Also, the long preamble estimates a channel including the initial time offset and the respective OFDM symbol is corrected by using the estimated channel.

However, a residual error may occur due to an initial estimating error and a time offset may occur due to a different variation. In order to track the residual error and the time offset, fixed pilot symbols are inserted into fixed subcarriers in the OFDM symbol. For example, in the IEEE 802.11a standard, the fixed pilot symbols are inserted into the −21, −7, 7, and 21 subcarriers, as shown in FIG. 2.

A method for estimating the respective parameters using the pilot symbols will be described.

Figure 3:
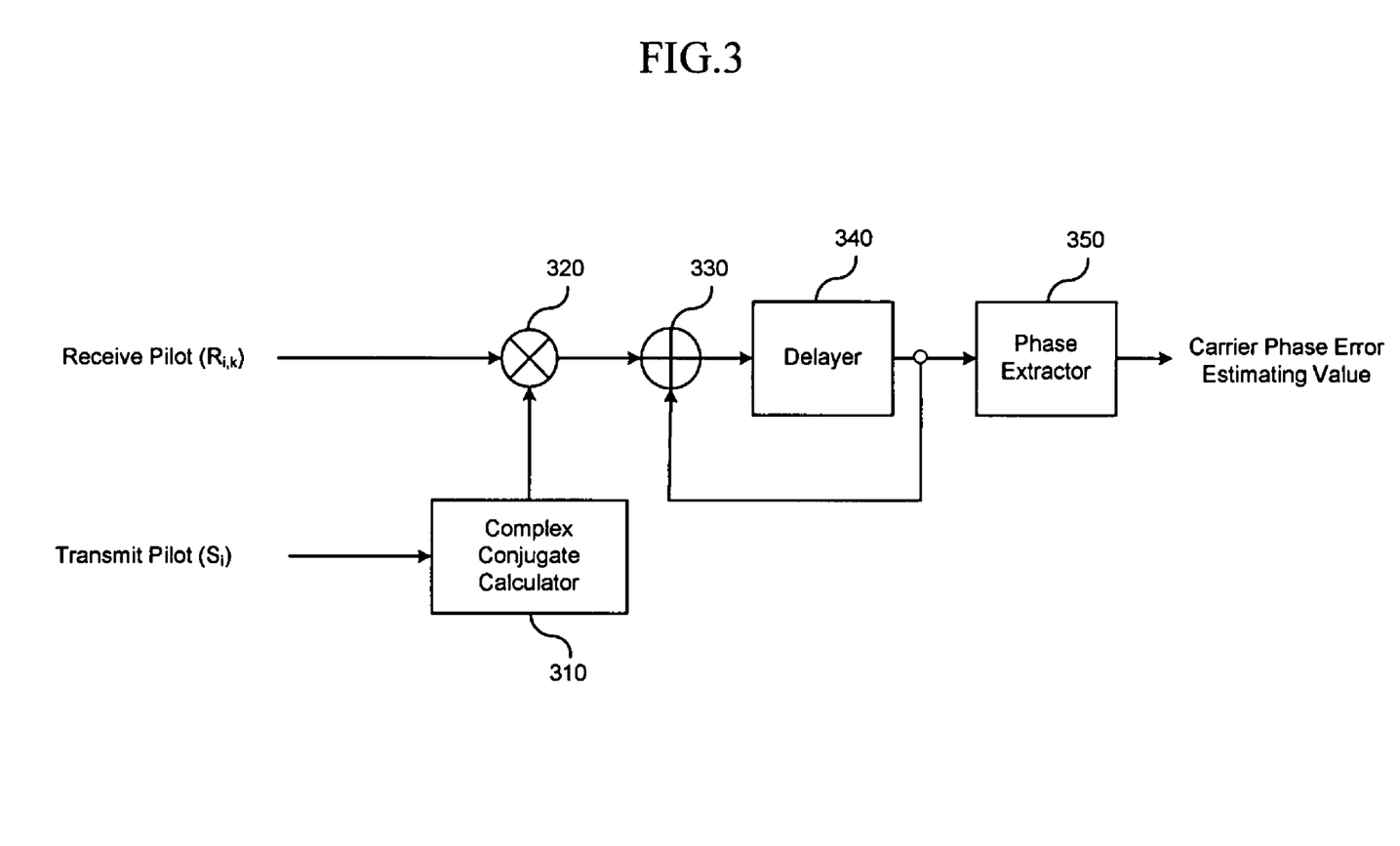
FIG. 3 is a block diagram for estimating variation of a carrier phase using a pilot subcarrier according to the exemplary embodiment of the present invention.

FIG. 3 is a block diagram for estimating a variation of a carrier phase using a pilot subcarrier according to the exemplary embodiment of the present invention.

The carrier frequency error may be estimated using the sum of phases of a receive pilot in Equation 4.

$$\phi_k = \text{angle}\left[\sum_{i \in P} R_{i,k} \cdot S_i^*\right] \quad \text{(Equation 4)}$$

In Equation 4, $\phi_k$ is given as a phase estimating value for the k-th OFDM symbol, and $R_{i,k}$ is given as the receive pilot symbol for the k-th OFDM symbol. Also, $S_i$ is a transmit pilot symbol for an i-th subcarrier. In this case, P is given as a group index for the entire pilot symbols.

In more detail, referring to FIG. 3, a complex conjugate calculator 310 converts a transmit pilot $S_i$, a multiplier 320 multiplies the converted transmit pilot $S_i$ by a receive pilot $R_{i,k}$ an adder 330 adds the multiplied value to an amount delayed by a delayer 340, and a phase extractor 350 extracts a phase. As a result, a carrier phase error estimating value is output. That is, the carrier frequency error is estimated using the sum of the phases $R_{i,k}$ of the receive pilot.

Figure 4:
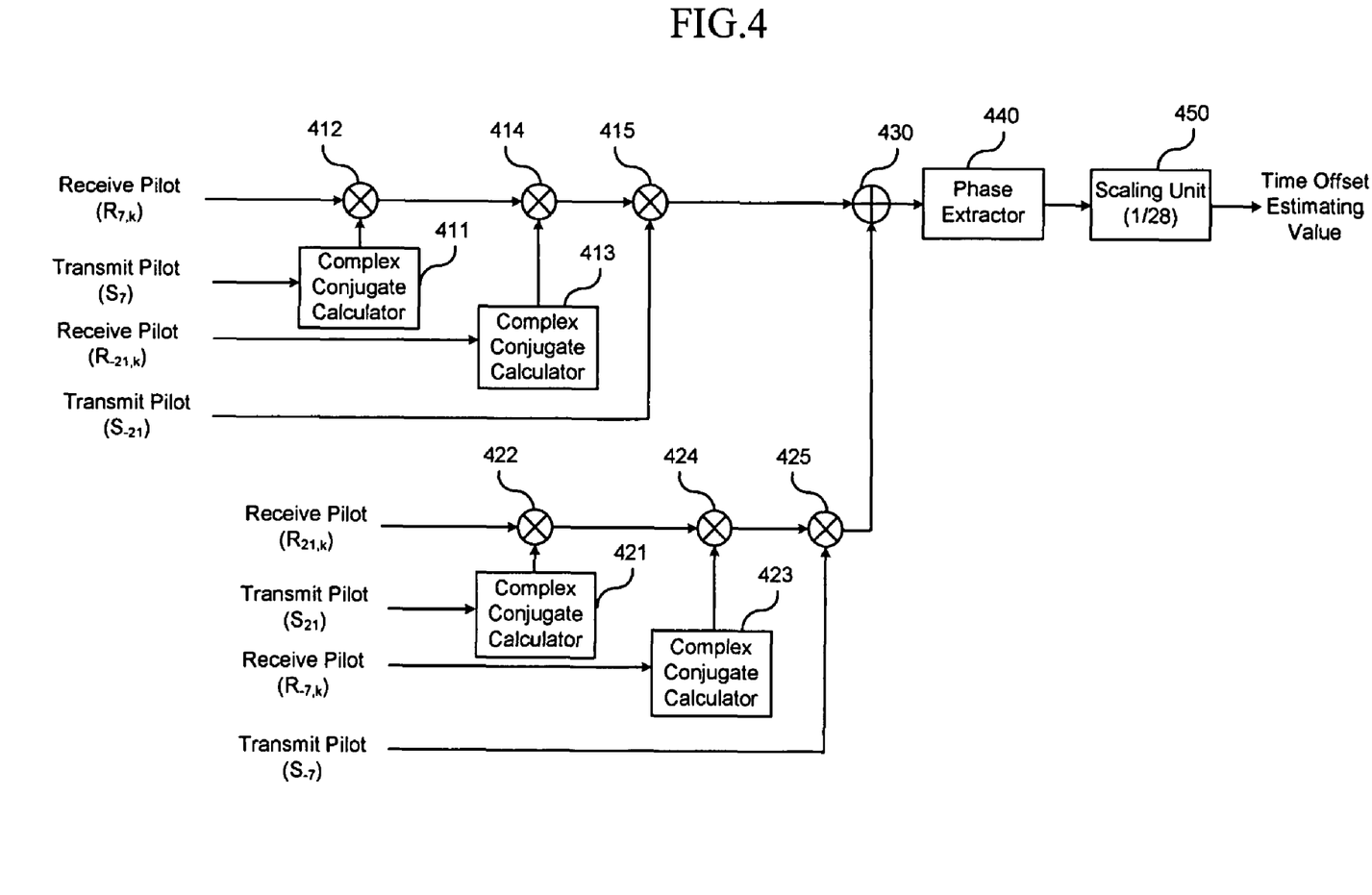
FIG. 4 is a block diagram for estimating a time offset using a pilot subcarrier according to the exemplary embodiment of the present invention.

FIG. 4 is a block diagram for estimating a time offset using a pilot subcarrier according to an exemplary embodiment of the present invention.

Referring to FIG. 4, a time offset estimator is formed as Equation 5 such that a slope of the phases is estimated. For example, a time offset $\phi_k$ of a k-th OFDM symbol is given as a quotient in which a phase difference between a first and third pilot and between a second and forth pilot is divided by 28, which is an index difference between the first and third pilot and between the second and forth pilot.

$$\varphi_k = \frac{\text{angle}\left[\begin{array}{c} R_{7,k} \cdot S_7^* \cdot R_{-21,k}^* \cdot S_{-21} + \\ R_{21,k} \cdot S_{21}^* \cdot R_{-7,k}^* \cdot S_{-7} \end{array}\right]}{28} \quad \text{(Equation 5)}$$

In more detail, when first receive and transmit pilots are respectively given as $R_{-21,k}$ and $S_{-21}$, second receive and transmit pilots are respectively given as $R_{-7,k}$ and $S_{-7}$, third receive and transmit pilots are respectively given as $R_{21,k}$ and $S_{21}$, and fourth receive and transmit pilots are respectively given as $R_{7,k}$ and $S_7$, the time offset $\phi_k$ of the k-th OFDM symbol is given as the quotient in which a phase difference between a first and third pilot and between a second and forth pilot is divided by 28, which is an index difference between the first and third pilot and between the second and forth pilot. In FIG. 4, reference numbers 411, 413, 421, and 423 indicate complex conjugate calculators, reference numbers 412, 414, 415, 422, 424, and 425 indicate multipliers (not explained), reference number 430 indicates an adder, reference number 440 indicates a phase extractor, and reference number 450 indicates a scaling unit for dividing the time offset by the index difference 28.

When a frame has a large residual frequency error or an abrupt frequency shift, a frequency error estimating unit using a pilot symbol is provided to estimate the residual frequency error and to correct the residual frequency error at a time domain before the FFT. When the frame has a large frequency error, performance deterioration occurs since ICI is caused between subcarriers by correcting only a phase in the frequency domain after the FFT.

According to the exemplary embodiment of the present invention, the frequency error may be estimated using a pilot and then the estimated frequency error may be corrected, as well as the initial carrier frequency error being corrected.

Figure 5:
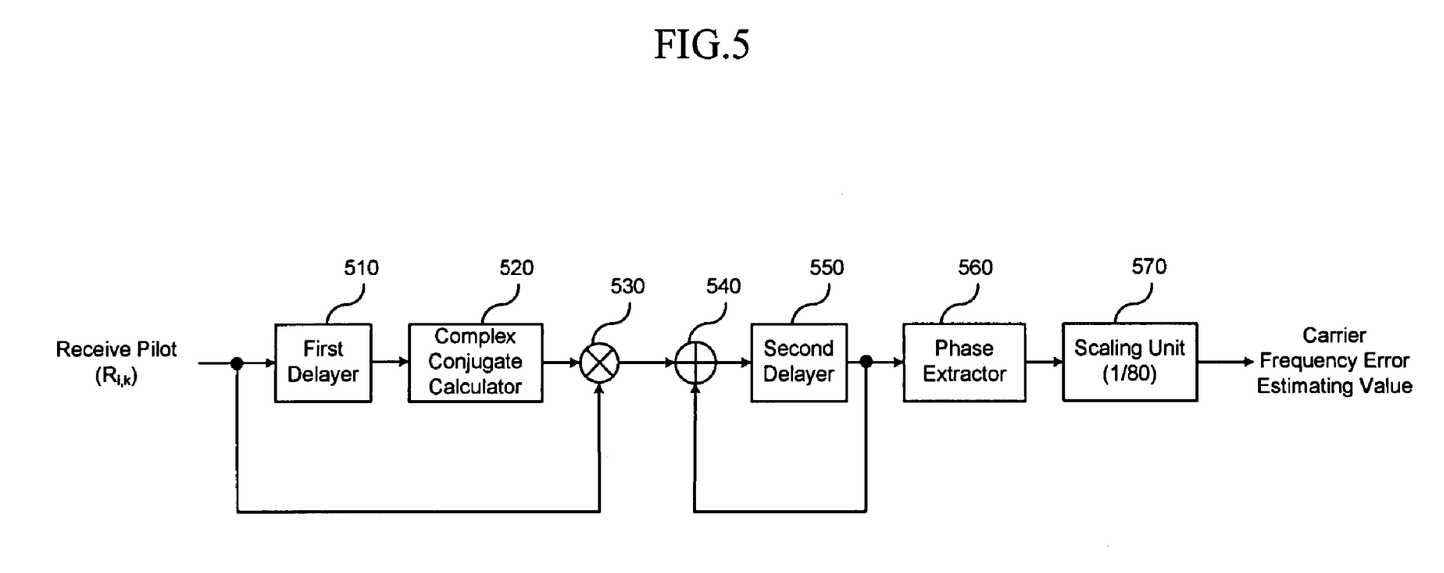
FIG. 5 is a block diagram for estimating a carrier frequency error using a pilot subcarrier according to the exemplary embodiment of the present invention.

FIG. 5 is a block diagram for estimating a carrier frequency error using a pilot subcarrier according to the exemplary embodiment of the present invention.

Referring to FIG. 5, the frequency error estimating method includes estimating a phase difference between the present OFDM symbol and the previous OFDM symbol and dividing the phase difference by 80 (from the IEEE 802.11a standard), which is a sample interval of the OFDM symbol, as in Equation 6.

$$\lambda = \frac{\text{angle}\left[\sum_{i \in P} R_{i,k} \cdot R_{i,k-1}^*\right]}{80} \quad \text{(Equation 6)}$$

In Equation 6, $\lambda$ indicates an estimated frequency error.

In detail, a first delay unit 510, a complex conjugate calculator 520, and a multiplier 530 receive a receive pilot $R_{i,K}$, an adder 540 adds a delay value, which is received from a second delay unit 550, to the receive pilot $R_{i,K}$, and then a phase extractor 560 extracts a phase and a scaling unit 570 divides the phase by 80, which is the sample interval of the OFDM symbol, and outputs the carrier frequency error estimating value.

Figure 6:
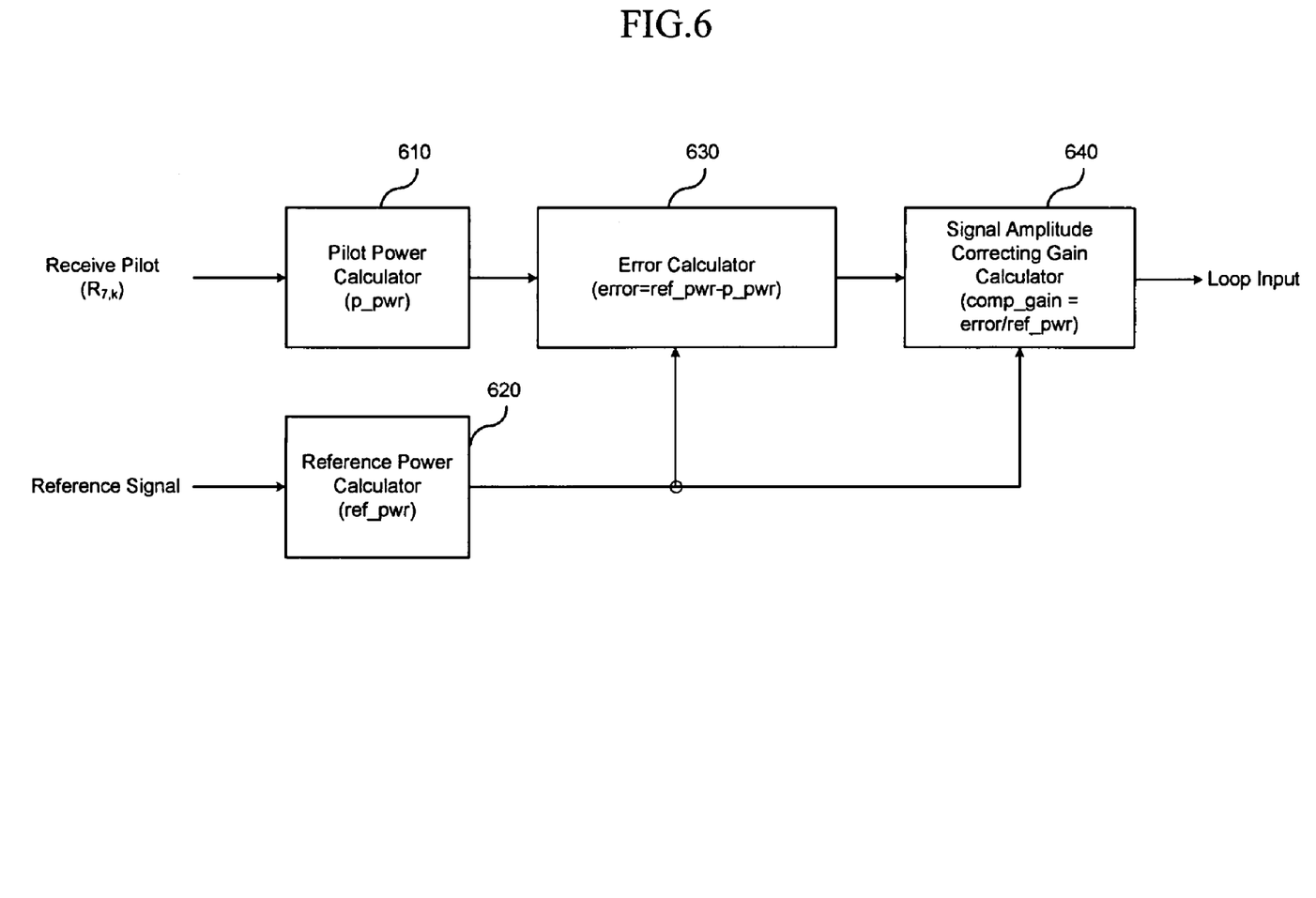
FIG. 6 is a block diagram for calculating a signal amplitude correcting gain using a pilot subcarrier according to the exemplary embodiment of the present invention.

Finally, a method for estimating a signal amplitude correcting gain is given as shown in FIG. 6.

FIG. 6 is a block diagram for calculating a signal amplitude correcting gain using a pilot subcarrier according to the exemplary embodiment of the present invention.

Referring to FIG. 6, a signal amplitude (p_pwrk) is calculated using the pilots of the respective OFDM symbol, as in Equation 7.

$$p\_pwr_k = \sum_{i \in P} |R_{i,k}|^2 \quad \text{(Equation 7)}$$

Before a pilot power calculator 610 calculates a gain, a reference power calculator 620 determines a reference signal amplitude (ref_pwr). In the same frame as IEEE 802.11a, the signal amplitude is determined using 4 symbols corresponding to pilot-positions in a long preamble as Equation 7.

Also, as Equation 8, an error calculator 630 calculates a signal amplitude error, that is, a power difference between the reference and a receive pilot (ref_pwr−p_pwr), and a signal amplitude correcting gain calculator 640 calculates the signal amplitude correcting gain value (comp_gain) using a ratio of the signal amplitude error and the reference power and uses the signal amplitude correcting gain value (comp_gain) as a loop input.

error=ref_pwr−p_pwr comp_gain=error/ref_pwr  (Equation 8)

Figure 7:
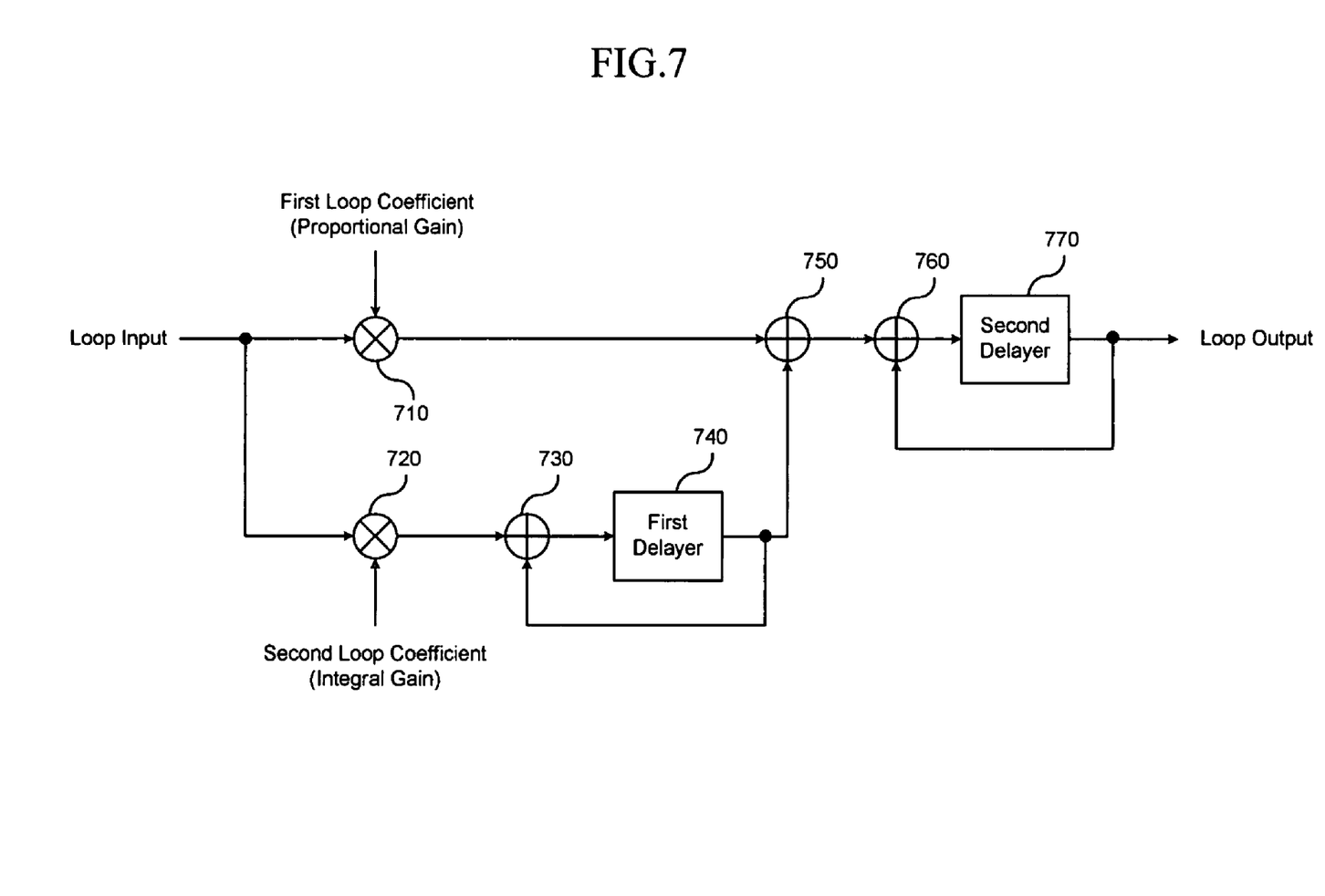
FIG. 7 is a flowchart showing a configuration of a loop filter through which an estimating value is passed before being corrected according to the exemplary embodiment of the present invention.

However, since the estimating errors are greatly affected when the calculated phase, time, and amplitude error estimating values are directly corrected as shown in FIG. 4 to FIG. 6, it is necessary to pass these estimating values through a secondary loop filter as shown in FIG. 7 so as to minimize the estimating error and to properly control a correcting speed. In this case, how the carrier frequency error can be corrected may be simply determined by using a first loop as shown in FIG. 8.

FIG. 7 is a flowchart showing a configuration of a loop filter through which an estimating value is passed before being corrected according to the exemplary embodiment of the present invention.

Referring to FIG. 7, a configuration of a loop filter through which an estimating value is passed before being corrected according to the exemplary embodiment of the present invention is well known and has two loop coefficients, a first loop coefficient (called "a proportional gain") and a second loop coefficient (called "an integral gain"). A first multiplier 710 multiplies the first loop coefficient by an input loop and a second multiplier 720 multiplies the second loop coefficient by the input loop. A first delayer 740 and a first adder 730 add the multiplied values, a second adder 750 adds the output of the first multiplier 710 and the first adder 730, and a third adder 760 adds the output of the second adder 750 to a delayed value of a second delayer 770 and outputs the loop.

Figure 8:
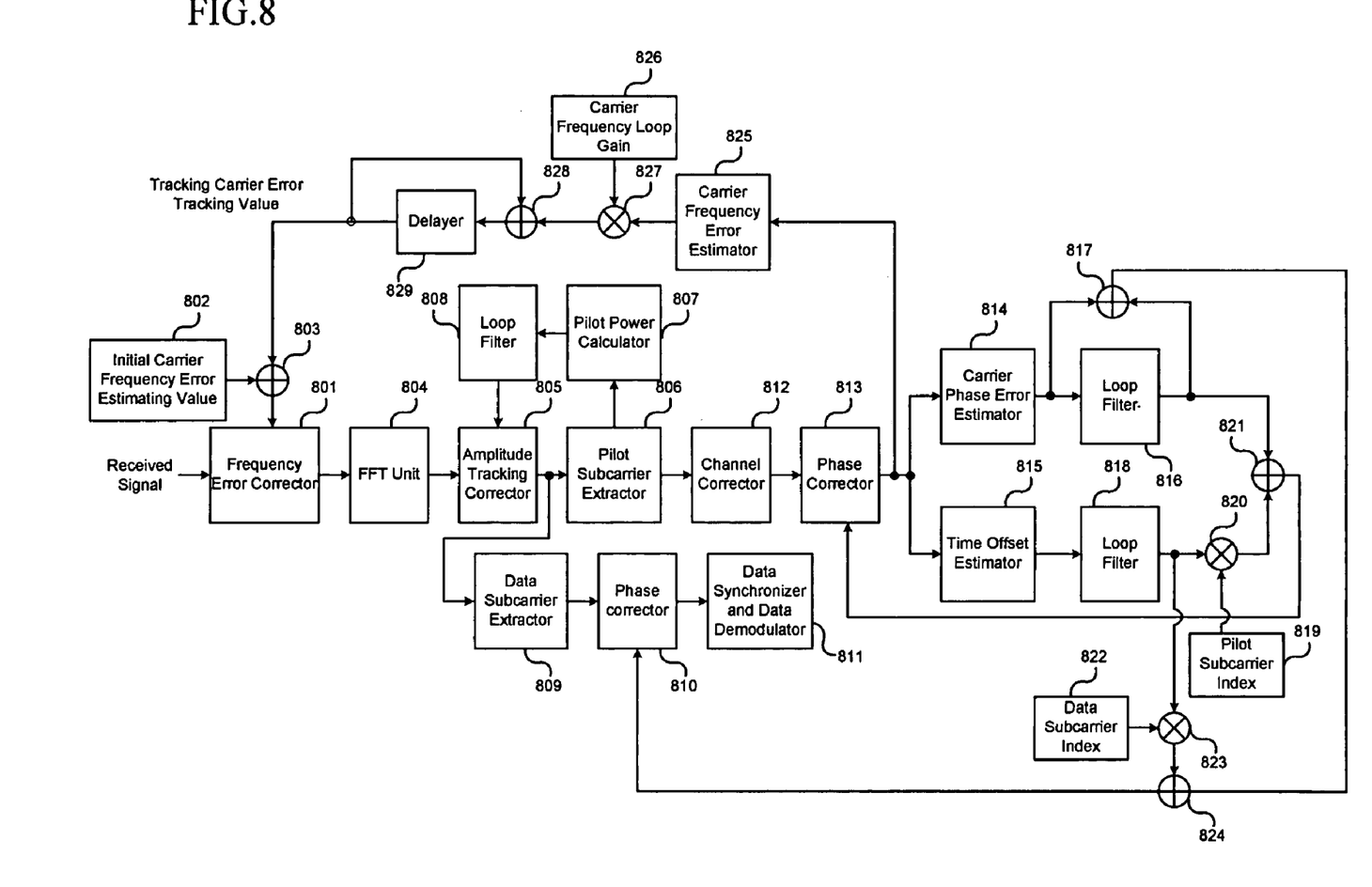
FIG. 8 is a block diagram of an apparatus for estimating a residual frequency error, a phase error, a time offset, and a signal amplitude variation for an OFDM system according to the exemplary embodiment of the present invention.

FIG. 8 is a block diagram of a residual frequency error, phase error, time offset, and signal amplitude variation estimating apparatus for an OFDM system according to the exemplary embodiment of the present invention.

Referring to FIG. 8, a residual frequency error, phase error, time offset, and signal amplitude variation tracking apparatuses for an OFDM system according to the exemplary embodiment of the present invention entirely includes the respective blocks as respectively shown in FIG. 3 to FIG. 7.

First, an adder 803 adds an initial carrier frequency error estimating value 802 to a tracking carrier error tracking value, and a frequency error corrector 801 corrects a carrier error in the received signal using the sum of the initial carrier frequency error estimating value and the tracking carrier error tracking value. That is, the frequency error corrector 801 corrects the received signal in a time domain by adding the tracking carrier frequency error tracking value to the initial carrier frequency error estimating value.

Also, an FFT unit 804 converts the received signal from the time domain to the frequency domain. That is, the frequency error corrector 801 and the FFT unit 804 form a receive block of an OFDM signal.

When the FFT unit 804 inputs the signal into an amplitude tracking corrector 805, the amplitude tracking corrector 805 controls the signal amplitude by multiplying the input signal by the outputs which a pilot power calculator 807 outputs and a loop filter 808 filters. At this time, a pilot subcarrier extractor 806 and a data subcarrier extractor 809 receive the amplitude-corrected signal.

The pilot data extractor 806 selects a pilot subcarrier among the entire subcarriers and outputs the selected pilot subcarrier. The data subcarrier extractor 809 selects a data subcarrier among the entire subcarriers and outputs the selected data subcarrier.

A channel corrector 812 multiplies a received pilot signal ($R_{i,k}$) with a complex conjugate ($H_i^*$) for a frequency channel response of the pilot signal and outputs the multiplied values, as Equation 9.

$$R_{i,k} \cdot H_i^*, i \in \{-21,-7,7,21\} \quad \text{(Equation 9)}$$

A carrier frequency error estimator 825, a carrier phase error estimator 814, and a time offset estimator 815 respectively receive the channel-corrected pilot and respectively estimate the respective parameters. In this case, the carrier phase error estimator 814 and the time offset estimator 815 transmit the respective parameters to the loop filters 816 and 818.

In addition, the carrier frequency error estimator 825 outputs the respective parameter, a multiplier 827 multiplies the output parameter by the carrier frequency loop gain 826, and an adder 828 adds the multiplied values to a delay unit 829. As above noted, the frequency error corrector 801 corrects the received signal by adding the tracking carrier error tracking value to the initial carrier frequency error estimating value.

In addition, a multiplier 820 multiplies the pilot subcarrier by a time error depending on a characteristic thereof, an adder 821 adds the multiplied values to the filtered parameters, and a phase corrector 813 finally corrects the received signal.

Finally, an adder 817 adds the present phase estimating value obtained from the carrier phase error estimator 814 to the output of the loop filter 816, and transmits the sum thereof to a phase corrector 810 so that the phase corrector 810 corrects the carrier phase error. That is, when the carrier phase is tracked and corrected, the pilot subcarrier is corrected by only the output of the loop filter and the data subcarrier is corrected by adding the present estimating value to the output of the loop filter.

In the case of such a phase variation, the present symbol is tracked and the carrier phase error is directly corrected at the present symbol. That is, it has a feedforward characteristic.

Accordingly, it is necessary to extract the pilot symbol by the FFT unit so as to have the feedforward characteristic. In this case, it should be understood that the residual frequency error, phase error, time offset, and signal amplitude variation tracking apparatuses as shown in FIG. 8 may be varied, although this will not be described for briefness of description.

According to an exemplary embodiment of the present invention, the frequency, phase, time, and amplitude errors may be sequentially tracked.

Figure 9:
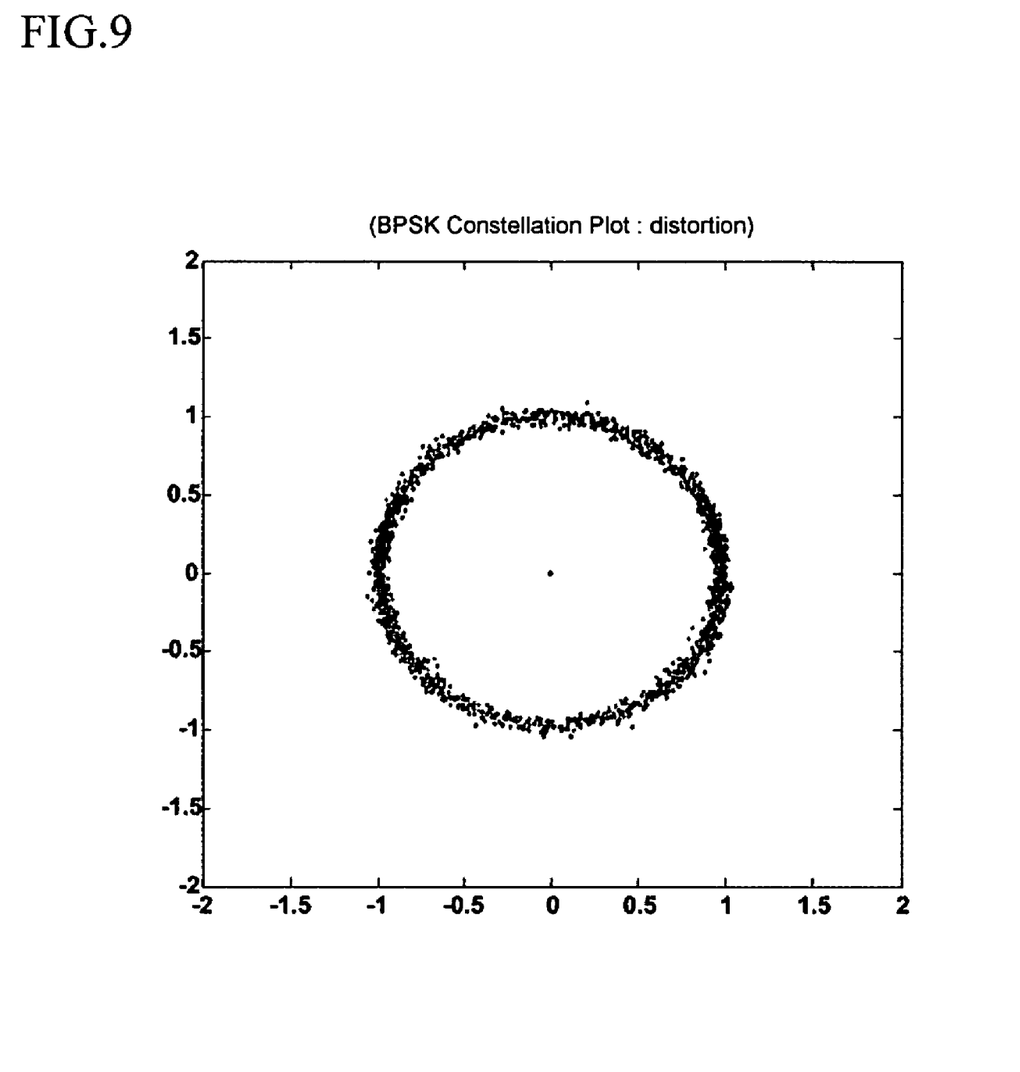
FIG. 9 is a BPSK constellation plot before tracking for showing a tracking performance according to the exemplary embodiment of the present invention.
Figure 10:
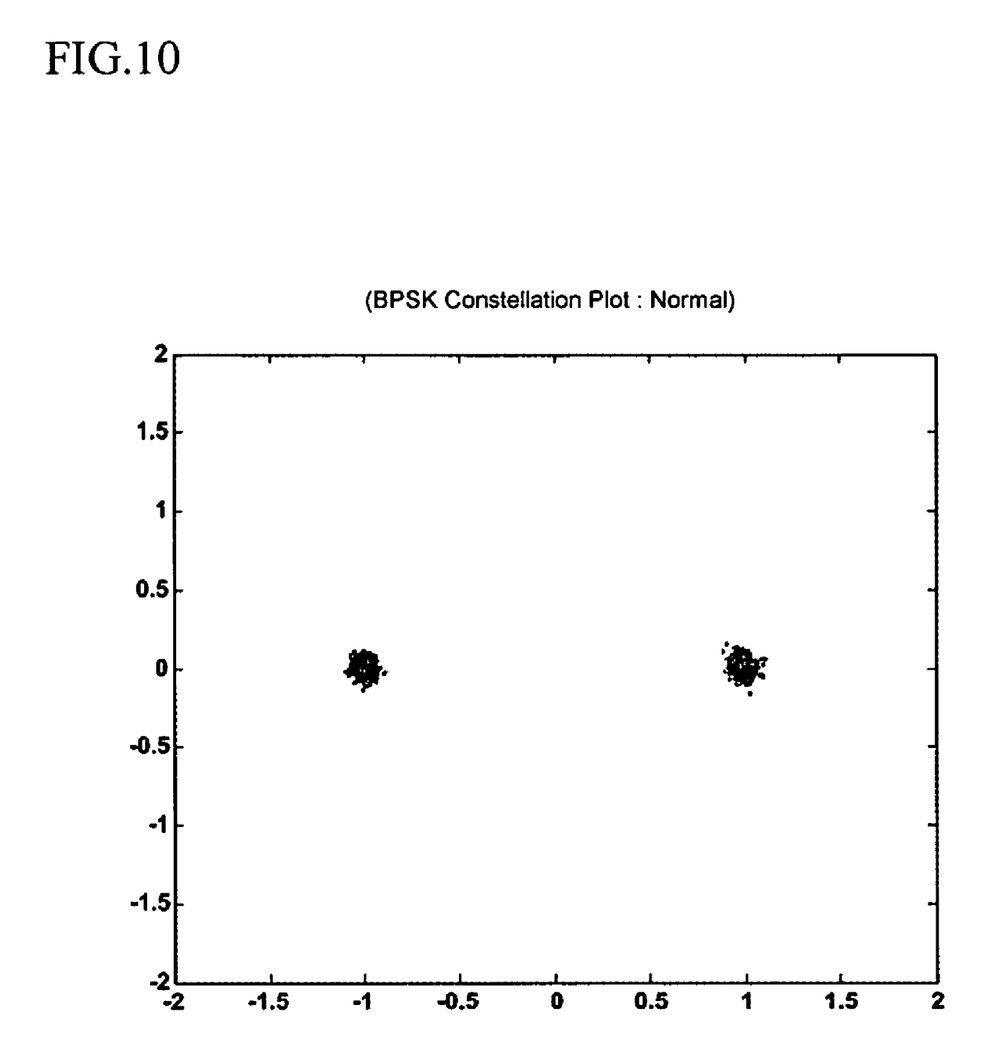
FIG. 10 is a BPSK constellation plot after tracking for showing a tracking performance according to the exemplary embodiment of the present invention.

FIG. 9 is a BPSK constellation plot before tracking for showing a tracking performance according to an exemplary embodiment of the present invention and FIG. 10 is a BPSK constellation plot after tracking for showing a tracking performance according to an exemplary embodiment of the present invention.

When the receive paths respectively have such a circuit, the present invention can be applied to multi-antenna system. Refereeing to FIG. 9, BPSK constellation plots have a distortion phenomenon when the initial synchronization is used without the above tracking process. However, with the above tracking process, the BPSK constellation plots can be normally recovered as shown in FIG. 10.

While this invention has been described in connection with what is presently considered to be the most practical exemplary embodiment, it is to be understood that the invention is not limited to the disclosed embodiment, but, on the contrary, is intended to cover various modifications and equivalent arrangements included within the spirit and scope of the appended claims.

According to an exemplary embodiment of the present invention, system performance can be enhanced by tracking an initial synchronization error, various other synchronization errors, and a signal amplitude variation which a radio frequency or analogue circuit may cause in an OFDM system, such as a wireless packet communication. In addition, cost for realizing the system can be reduced since the performance can be enhanced even though the relatively inexpensive radio frequency and analogue elements have relatively low performance.

What is claimed is:

1. An error tracking apparatus for tracking a residual frequency error, a phase error, a time offset, and a signal amplitude variation in an orthogonal frequency division multiplexing (OFDM) system, comprising:
    a frequency error corrector for correcting a frequency in a time domain by adding a tracking carrier error estimating value to an initial carrier frequency error estimating value;
    a signal amplitude tracking corrector for controlling a signal amplitude by multiplying a fast Fourier transform (FFT) of an input signal by an output value corresponding to a power calculating amount of a receive pilot signal, wherein the signal amplitude tracking corrector operates after the frequency error corrector;
    a Fourier Transform unit for extracting only the receive pilot signal;
    a channel corrector for outputting a channel corrected pilot by multiplying the receive pilot signal by a complex conjugate of a frequency channel response of the receive pilot signal;
    a carrier frequency error estimator for estimating a carrier frequency error parameter using the channel-corrected pilot and providing the tracking carrier frequency error estimating value;
    a time offset estimator for estimating a time offset parameter using the channel-corrected pilot; and
    a carrier phase error estimator for estimating a carrier phase error parameter using the channel-corrected pilot,
    wherein at least one of the carrier frequency error parameter, the time offset parameter and the carrier phase error parameter is estimated by the receive pilot signal allocated for a present symbol and is applied to a data signal of a present symbol,
    wherein the carrier phase error estimator employs a feedforward scheme in which the present symbol is tracked and the carrier phase error is directly corrected at the present symbol.

2. The error tracking apparatus of claim 1, wherein the carrier phase error estimator, the time offset estimator, and the signal amplitude tracking corrector respectively include a second loop filter for minimizing influence of an estimating error and controlling a correcting speed.

3. The error tracking apparatus of claim 2, wherein on tracking and correcting a carrier phase, a pilot subcarrier is corrected by the output of the loop filter and a data subcarrier is corrected by adding the present estimating value to the output of the loop filter.

4. The error tracking apparatus of claim 1, wherein a time offset estimated by the time offset estimator is multiplied by a pilot subcarrier and is corrected by the phase correctors for the pilot subcarrier and a data subcarrier.

5. The error tracking apparatus of claim 1, wherein the carrier frequency error estimator determines how the carrier frequency error is corrected using a first loop.

6. The error tracking apparatus of claim 5, wherein the frequency error corrector corrects a frequency error by multiplying the output of the carrier frequency error estimator by a carrier frequency loop gain and then adding the multiplied carrier frequency to the initial carrier frequency error estimating value.

7. An error tracking method for tracking a residual frequency error, a phase error, a time offset, and a signal amplitude variation in an orthogonal frequency division multiplexing (OFDM) system, comprising:
    a1) extracting only a receive pilot signal by Fourier Transform;
    a) estimating a carrier frequency error parameter by the receive pilot signal;
    b) estimating a time offset parameter by the receive pilot signal;
    c1) estimating a carrier phase error parameter by the receive pilot signal;
    c) correcting a frequency error in a time domain before performing a fast Fourier transform for controlling a signal amplitude by estimating the frequency error using the receive pilot signal on there being a large residual frequency error or an abruptly shifted frequency phase;
    d) if during said correcting the residual frequency error, said correcting is above a predefined amount, correcting the frequency error by adding an initial carrier frequency error to a tracking carrier error estimating value;
    e) estimating a signal amplitude error using the receive pilot signal according to the signal amplitude; and
    f) controlling the signal amplitude by multiplying a fast Fourier transform (FFT) of an input signal by an output value corresponding to a power calculating amount of the receive pilot signal,
    wherein at least one of the carrier frequency error parameter, the time offset parameter and the carrier phase error parameter is estimated by the receive pilot signal allocated for a present symbol and is applied to a data signal of a present symbol, wherein the estimating a carrier phase uses a feedforward scheme in which the present symbol is tracked and the carrier phase error is directly corrected at the present symbol.

8. The error tracking method of claim 7, wherein the carrier phase error, the time offset, and the signal amplitude variation are respectively passed through a second loop filter so as to minimize influence on the estimated error and to control a correcting speed.

9. The error tracking method of claim 7, wherein at e), the amplitude error according to the signal amplitude is obtained by a difference between the reference power and the power of the receive pilot symbol using the pilot symbol, and the correcting gain value of the signal amplitude is determined using the proportion of the reference power to the amplitude error.

* * * * *